United States Patent [19]

Hosomura et al.

[11] 4,332,851

[45] Jun. 1, 1982

[54] RECEPTOR SHEET FOR ELECTROPHOTOGRAPHY

[75] Inventors: Hiroyoshi Hosomura; Koichi Aota; Eiji Yoshimura, all of Tokyo, Japan

[73] Assignee: Rank Xerox Limited, London, England

[21] Appl. No.: 129,494

[22] Filed: Mar. 11, 1980

[30] Foreign Application Priority Data

Apr. 10, 1979 [JP] Japan .................................. 54-42603

[51] Int. Cl.[3] .................................................. B32B 5/16

[52] U.S. Cl. .................................... 428/325; 427/121; 428/323; 428/330; 428/342; 428/537; 430/69; 430/112

[58] Field of Search ................ 260/29.7 AT, 29.7 SQ, 260/29.4 UA; 427/121; 428/323, 342, 511, 512, 537; 430/69, 112

[56] References Cited

U.S. PATENT DOCUMENTS

| | | | |
|---|---|---|---|
| 2,487,060 | 11/1949 | Pike et al. | 418/330 |
| 2,554,899 | 5/1951 | Cowgill | 428/342 |
| 2,662,040 | 12/1953 | Thomas | 428/512 |
| 2,685,538 | 8/1954 | Stinchfield et al. | 428/512 |
| 3,396,049 | 8/1968 | Anderson et al. | 428/512 |
| 3,468,698 | 9/1969 | Pelletier et al. | 428/323 |
| 3,714,107 | 1/1973 | Smith | 428/330 |
| 4,069,188 | 1/1978 | Canard et al. | 428/511 |

*Primary Examiner*—James J. Bell

[57] ABSTRACT

A coated paper suitable for use in an electrophotographic process for receiving an image formed by a magnetic brush device with a single component developer is disclosed. The paper is coated with a composition made of a styrene/butadiene latex and a crosslinking agent for the latex, together with any desired pigment and nonionic emulsifier. The composition may be economically coated onto paper at an amount about 1 to 5 grams per square meter.

7 Claims, No Drawings

RECEPTOR SHEET FOR ELECTROPHOTOGRAPHY

BACKGROUND OF THE INVENTION AND PRIOR ART STATEMENT

This invention relates to a receptor sheet for electrophotography. More specifically, it relates to a receptor sheet which is suitable for receiving a toner image transferred to the surface of an electrophotographic recording medium after formation thereon by a magnetic brush method using a carrierless one-component developer, said transferred image being subsequently fixed under pressure.

In recent years, a magnetic brush developing method using a one-component developer and a method of fixation under pressure have attracted attention in order to reduce power consumption in a copying machine, increase the maintainability and reliability of the copying machine, reduce the cost of the machine, and to impart quick starting properties. Since a toner containing a magnetic power is used in the magnetic brush developing method using a one-component developer, the transferability of the resulting image is poor when using a receptor sheet of the high-quality paper type used in conventional copying machines. It has the further defect that the copies obtained has a low image density and a disturbed edge. This phenomenon is especially pronounced in a high-humidity atmosphere, and poses a serious problem in practical application. This is because at the time of transfer, a transfer charge of a polarity opposite to the charge of the toner given to the sheet is injected into the toner beyond the interface between the sheet and the toner, for example, by corona discharge of the corotron-type, and thus the toner is retransferred to the surface of the photosensitive material or reciprocates between the sheet and the surface of the photosensitive material. In general, the speed of movement of a transfer charge in paper increases with moisture absorption. Specifically, the insulating property of the paper is reduced upon moisture absorption, and the speed of movement of the charge increases. Also, when the fixation under pressure is performed by means of press rollers, disturbance may be caused in the toner image on the sheet surface at the time of the entry of the sheet into the gap between the rollers because the electrostatic attracting force between the sheet and the toner is small or when the fixed image is rubbed with a finger or paper, it readily drops off. Thus, such a method is not satisfactory for practical application.

A method comprising coating paper with an aqueous emulsion of a hydrophobic resin would be an effective means for increasing the insulating property of paper, reducing its humidity dependence and to improve pressure fixability. Suitable commercially available resin emulsions for this method include emulsifier-free emulsions of acrylate ester of vinyl acetate resins from the standpoint of insulating property. Since these emulsions do not contain a hydrophilic surface-active agent as an emulsifier, they form a hydrophobic, insulating continuous coating when coated on paper, and thus the transferability of an image is improved. The pressure fixability can be markedly improved by selecting soft to medium hard resin emulsions. The use of a self-crosslinking type emulsion, or a combination of a reactive emulsion and a crosslinkable thermosetting resin is also found to be effective. Many of such emulsions are emulsions of acrylate ester-type resins which have been used previously for textile finishing.

However, these emulsions have poor miscibility with pigments, especially with organic pigments. Furthermore, the stability of the paint is low. Thus, flocculation or gum-up of the emulsion may occur, or in the case of on-machine size press coating, the drying cylinder and canvas may be contaminated. As stated hereinabove, the coating and impregnation of these emulsions on paper have not yet been fully achieved on a commercial basis, and the relatively high cost of the aforesaid emulsions also poses a problem.

In Pike et al. U.S. Pat. No. 2,487,060, there is disclosed a barrier coat for adhesive sheets or tapes which has an adhesive composition applied to a flexible porous backing such as paper, cloth, etc. The purpose of the barrier coat is to prevent excessive penetration of the adhesive composition into the backing which results in a waste of the adhesive material and reduces the quality of the final product. The barrier coat of Pike et al is made of a synthetic rubber, such as polychloroprene or butadiene-styrene copolymer, with fillers such as magnesium oxide and clay, as well as plasticizers, curing agents, and softening agents.

In Pelletier et al. U.S. Pat. No. 3,468,698, a pigment coated paper designed for offset printing is disclosed. An example of the coating composition of Pelletier et al is a mixture containing 8 to 10 percent styrenebutadiene latex admixed with 70 to 80 percent calcium carbonate and clay, together with smaller amounts of other materials. This coating composition was coated onto a paper at a rate of 6½ to 9 pounds per 3,300 square feet, which is roughly equivalent to about 9.6 to 13.4 grams per square meter.

In Middletown et al. U.S. Pat. No. 3,655,608, there is disclosed a coated paper which is suitable for printing. The coating composition is a mixture of polymerizable binder material and a pigment pretreated with a hydroxyl- or hydrogen-reactive organic chemical. The binder of Middletown et al is an adhesive such as a polyester or polyether. Examples of the hydrogen and/or hydroxyl-reactive compounds are isocyanates and silanes. The binder component can be a monomer or a polymer, which can be crosslinked or cured after admixture with the treated pigment.

SUMMARY OF THE INVENTION

It is an object of this invention to provide an electrophotographic receptor sheet having good transferability and pressure fixability and superior properties inherent to ordinary paper.

Another object of this invention is to provide an electrophotographic receptor sheet which is easy to produce by coating or impregnation with good stability of a coating composition, and which is inexpensive.

In accordance with the present invention, a receptor sheet is provided for development with a single component developer and pressure fixation in electrophotography, which has superior transferability and pressure fixability, and which is obtained by coating or impregnating a base paper with a coating composition consisting of a mixture of a crosslinking agent and a styrene/-butadiene latex used conventionally in large quantities as a binder for coated papers and art paper.

As the base paper for the electrophotographic receptor sheet of this invention, almost all types of paper such as high quality paper, medium quality paper and transparent paper can be used. From the standpoint of a coating operation, high quality paper and base papers for coated papers are preferred because a uniform continuous coated film can be easily formed thereon by using a reduced amount of the coating composition.

In addition to the characteristic of low cost, the styrene/butadiene latex serves to increase the degree of pressure fixability by its rubber elasticity property, and to prevent the degradation of paper at the time of pressure fixation. From the standpoint of pressure fixability, the latex desirably has a styrene content of not more than 50 percent. Many other latices such as an acrylonitrile/-butadiene latex or a methyl methacrylate/butadiene latex can also be used insofar as they produce such an effect. However, these other latices pose some problem in regard to miscibility with pigments, and the stability of the resulting coating compositions, and are inferior to the styrene/butadiene latex in regard to operability in coating or impregnation. Even when the styrene/-butadiene latex alone is coated on a base paper, its transferability is improved, and a substantially satisfactory image density can be obtained. But some disturbance of the image edge remains. This is believed to be attributable to the fact that the emulsifier contained in the styrene/butadiene latex is exposed on the surface of the resulting coating to form a small area having hydrophilicity but no insulating property.

When the amount of the coating composition coated or impregnated is considerably increased in order to obtain a sufficient image quality, gloss (glistening luster) or blocking occurs in the paper, and the properties inherent to ordinary paper are impaired. These problems are solved by using a crosslinking agent in combination. As a result of crosslinking reaction induced by the crosslinking agent, the aggregate of the emulsion is occluded by the polymer film. Hence, a uniform coated film can be obtained even by using a small amount of the coating composition to be coated or impregnated, and a good image quality can be obtained. Ionic and nonionic surface active agents are widely used as emulsifiers in latices and emulsions. Examples of the ionic surface active agents include anionic surfactants such as alkali salts of fatty acids, soaps (e.g., metal soaps, resin acid soaps), salts of sulfuric esters and sulfonic acid salts; cationic surfactants such as primary amino salts, secondary amino salts, tertiary amino salts, quaternary ammonium salts, and pyridinium salts; and amphoteric surfactants of the carboxylic acid type, the sulfate type, or the sulfonic acid type (by anions of the active groups). The nonionic surfactants are surfactants in which the hydrophilic group is composed of a nondissociable hydrophilic group such as a hydroxyl group, an ether linkage group or a thioether linkage group, and which do not dissociate into ions in aqueous solution. Examples are polyoxyethylene alkyl ethers, polyoxyethylene alkylphenyl ether, polyoxyethylene alkyl esters, sorbitan alkyl esters, and polyoxyethylene sorbitan alkyl esters. These surfactants greatly affect the quality of the coated film to be formed by the latex or emulsion. Since the ionic surfactants have poor compatibility with the polymers of the latices and emulsions, the resulting coated film is nonuniform with the presence of an aggregate of the surfactant, and the image is disturbed. Accordingly, the ionic surfactants are undesirable. Since the nonionic surfactants have much better compatibility with resins than the ionic surfactants, they are dissolved and diffused in the polymer during the process of forming a coated film. Thus, a uniform coated film can be obtained, and a good quality image can be obtained.

Specifically, receptor sheets of good quality can be obtained when a base paper is coated or impregnated with a coating composition prepared by mixing a styrene/butadiene latex with a crosslinking agent, or preferably with a coating composition prepared by mixing a styrene/butadiene latex with a crosslinking agent and a nonionic surfactant as an emulsifier.

When an emulsifier-free styrene/butadiene latex is used, the aforesaid problems are seemingly solved. However, the emulsion has poor stability, and its operability is reduced. Most of commercially available SBR latices are carboxy-modified, and therefore, bases are added to impart stability to the latices. These bases markedly hamper the crosslinking reaction induced by the crosslinking agent, and sufficient film properties cannot be obtained. Those not containing such bases have poor stability, and are not practical. These problems can be solved by using volatile bases such as ammonia or methylamine which are volatilized during the formation of a coated film. The crosslinking effect can be increased by introducing various reactive comonomers into the latex by copolymerization, etc. and using a crosslinking agent corresponding to the reactive functional group of the comonomer. Examples of functional groups and reactive comonomers used to introduce these groups are tabulated below.

| FUNCTIONAL GROUP | REACTIVE COMONOMERS |
|---|---|
| Epoxide group | Glycidyl acrylate, glycidyl methacrylate, allyl glycidyl ether. |
| Amino group | Dimethylaminoethyl methacrylate, vinylpyridine, tert-butylaminoethyl methacrylate. |
| Carboxyl group | Acrylic acid, methacrylic acid, crotonic acid, itaconic acid, a half-ester of itaconic acid, maleic acid, a half-ester of maleic acid. |
| Acid anhydride group | Itaconic anhydride, maleic anhydride. |
| Hydroxyl group | Allyl alcohol, 2-hydroxyethyl methacrylate, 2-hydroxyethyl acrylate, 2-hydroxypropyl methacrylate, 2-hydroxypropyl acrylate, a monoallyl ether of a polyhydric alcohol. |
| N-methylolamide and its ether | N-methylol acrylamide, N-methylol methacrylamide, and the ethers thereof. |
| Amide group | Acrylamide, methacrylamide, maleinamide. |
| Isocyanate | Vinyl isocyanate, allyl isocyanate. |

The crosslinking agent needs to be mixed with the polymer of the latex. Even when it does not crosslink with the latex polymer, modification can be effected by the crosslinking of the crosslinking agent itself. As such self-crosslinkable crosslinking agents, dialdehyde resins, aminoformaldehyde resins, urea-formaldehyde resins, epoxy resins, etc. can be used. A melamine-formaldehyde resin produces an especially good result. A better crosslinking effect can be obtained by using a crosslinking agent which crosslinks with the reactive functional group of the latex polymer. Examples of a crosslinking agent which is reactive with functional groups are as follows:

| FUNCTIONAL GROUP OF THE LATEX POLYMER | CROSSLINKING AGENT |
|---|---|
| —OH | Amino-formaldehyde resins, polyisocyanate compounds, blocked isocyanate compounds, polyaminoimide compounds. |
| —COOH | Amino-formaldehyde resins, epoxy resins, polyvalent oxazoline, and polyvalent metal salts. |
| $-CONH_2$ | Epoxy resins |
| $-CONH$ (with $CH_2OR$ below) | Melamine-formaldehyde resins, polyhydroxy compounds. |
| 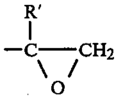 | Polycarboxylic acids, polyamines, polyhydric phenols, hydroxycarboxylic acids, aminocarboxylic acids. |
| 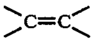 | Peroxides |

These coating compositions may contain inorganic and organic pigments to impart the properties inherent to ordinary paper, and to prevent blocking.

The suitable amount of the crosslinking agent is 10 to 150 parts by weight per 100 parts by weight, as solids, of the styrene/butadiene latex. When the amount of the crosslinking agent is more than 150 parts by weight, the density of the image is reduced. Moreover, the coated film loses rubbery elasticity, and pressure fixability is deteriorated. If the amount of the crosslinking agent is less than 10 parts by weight, the transferability is not sufficiently improved. Moreover, gloss or blocking occurs to deteriorate the properties inherent to ordinary paper.

Pigments used for improving the surface characteristics of ordinary paper can be added. The suitable amount of such a pigment is 10 to 80 parts by weight per 100 parts by weight of the solids content of the latex. If the amount of the pigment exceeds 80 parts by weight, the coated film of the styrene/butadiene latex loses elastic tackiness, and pressure fixability is deteriorated. If the amount is less than 10 parts by weight, the properties inherent to ordinary paper are deteriorated. The amount of the coating composition applied is perferably 1 g/m$^2$ to 5 g/m$^2$ on one surface of the base paper. If it is less than 1 g/m$^2$, transferability and pressure fixability are insufficient. If it exceeds 5 g/m$^2$, the properties to ordinary paper are degraded.

These coating compositions can be coated on a base paper by an off-machine coater on a paper machine, such as a size press, an air knife coater, a blade coater, a roll coater or a bar coater.

To promote the reaction between the styrene/butadiene latex and the crosslinking agent coated or impregnated on or in the base paper, the paper may be heat-treated. The heat treatment is carried out at 90° to 180° C. for about 30 seconds to about 3 minutes. Usually, a drying device for drying the coated or impregnated paper may be used concurrently to perform the heat treatment. Formation of a dielectric recording layer of an electrostatic recording sheet by coating can also be utilized in the methods described hereinabove.

EXAMPLES 1 TO 3 AND COMPARATIVE EXAMPLES 1 TO 3

Each of the coating compositions having the formulations shown in Table 1 below was coated by means of a bar coater on one surface of high quality paper prepared from kraft pulp of broad-leaved tree, and dried at 120° C. for 1 minute to form a receptor sheet.

Using each of the reulting receptor sheets, a latent electrostatic image formed on a photosensitive material was developed with a one-component magnetic toner, transferred, and fixed in an electrophotographic copying machine to obtain a copy.

The copy was tested, and the results are shown in Table 2.

Comparative examples are also shown in Tables 1 and 2. The papers were conditioned for 4 hours in an atmosphere kept at 20° C. and 65° RH before copying.

TABLE 1

| | FORMULATION Formulation of coating composition | | | | | |
|---|---|---|---|---|---|---|
| Example (Ex.) or Comparative Example (CEx.) | Latex | Crosslinking Agent | Mixing ratio of the latex to the crosslinking agent | Pigment | Mixing ratio of the latex to the pigment | Amount of coating (one surface, g/m$^2$) |
| Ex. 1 | Commercially avalible SBR latex (POLYLACK 752 made by Mitsui Toatsu) | Melamine-formaldehyde (Sumirez resin 613, made by Sumitomo Chemical) | 100:40 | Calcium carbonate | 100:50 | 3 |
| Ex. 2 | Ammonia stabilized SBR latex (made by Nippon Zeon | Melamine-formaldehyde (Sumirez resin 613, made by Sumitomo Chemical) | 100:50 | Clay (Ebara kaolin) | 100:25 | 3 |
| Ex. 3 | Crosslinkable SBR latex (made by Nippon Zeon) | Urea-formaldehyde (U-RAMINT-LG, made by Mitsui Toatsu) | 100:10 | Clay (Ebara kaolin) | 100:70 | 4 |
| CEx. 1 | — | — | — | — | — | — |
| CEx. 2 | Acrylate emulsion (LX 851, made by Nippon Zeon) | Urea-formaldehyde (U-RAMINT-LG, made by Mitsui Toatsu) | 100:40 | — | — | 4 |
| CEx. 3 | SBR latex (POLYLACK 752, made by Mitsui Toatsu) | — | — | Clay (Ebara Kaolin) | 100:50 | 3.5 |

TABLE 2

| Example (Ex.) or Comparative Example (CEx.) | EVALUATION Image Density (the density of a solid black image area was measured by a Macbeth densitometer) | Clearness of the Image (visually evaluated) | Degree of Pressure Fixability (evaluated by a peeling test using an adhesive tape) | Properties Inherent to Ordinary Paper |
|---|---|---|---|---|
| Ex. 1 | 1.42 | Good | Good | Almost equivalent to ordinary paper |
| Ex. 2 | 1.41 | Good | Somewhat poor | Almost equivalent to ordinary paper |
| Ex. 3 | 1.35 | Good | Good | Slightly different from ordinary paper |
| CEx. 1 | 0.71 | Disturbance of the toner exists in the edge of the image, and the image has poor clearness | Easily peeled off | Almost equivalent to ordinary paper |
| CEx. 2 | 1.32 | Good | Good | Considerably different from ordinary paper |
| CEx. 3 | 1.42 | Disturbance of the toner exists in the edge of the image, and the image has poor clearness | Good | Slightly different from ordinary paper |

While the invention has been described in detail with reference to specific preferred embodiments, it will be appreciated that various modifications may be made from the specific details without departing from the spirit and scope of the invention.

What is claimed is:

1. A coated paper suitable for use in an electrophotographic process for receiving an image formed by a magnetic brush device with a single component developer, said paper having a surface coated with a composition comprising about 100 parts by weight of a styrene/butadiene latex with 40 parts by weight of a melamine-formaldehyde resin as a crosslinking agent, and about 50 parts by weight of calcium carbonate as a pigment, said coating composition being coated on paper at an amount of about 3 grams/square meter.

2. A coated paper according to claim 1 wherein the styrene content in said styrene/butadiene latex is less than about 50 percent by weight.

3. A coated paper according to claim 1 wherein the coating composition further comprises a non-ionic surfactant as an emulsifier for said styrene/butadiene latex.

4. A coated paper suitable for use in an electrophotographic process for receiving an image formed by a magnetic brush device with a single component developer, said paper having a surface coated with a composition comprising about 100 parts by weight of a styrene/butadiene latex, about 50 parts by weight of a melamine-formaldehyde resin as a crosslinking agent and about 25 parts by weight of a kaolin clay as a pigment, said coating composition being coated on paper at an amount of about 3 grams/square meter.

5. A coated paper according to claim 1, wherein the styrene content in said styrene/butadiene latex is less than about 50 percent by weight.

6. A coated paper according to claim 5 wherein the coating compositions further comprises a non-ionic surfactant as an emulsifier for said styrene/butadiene latex.

7. A coated paper suitable for use in an electrophotographic process for receiving an image formed by a magnetic brush device with a single component developer, said paper having a surface coated with a composition comprising about 100 parts by weight of a styrene/butadiene latex, about 10 parts by weight of a urea-formaldehyde resin as a crosslinking agent, and about 70 parts by weight of a kaolin clay as a pigment, said coating composition being coated on paper at an amount of about 4 grams/square meter.

* * * * *